United States Patent Office 2,930,437
Patented Mar. 29, 1960

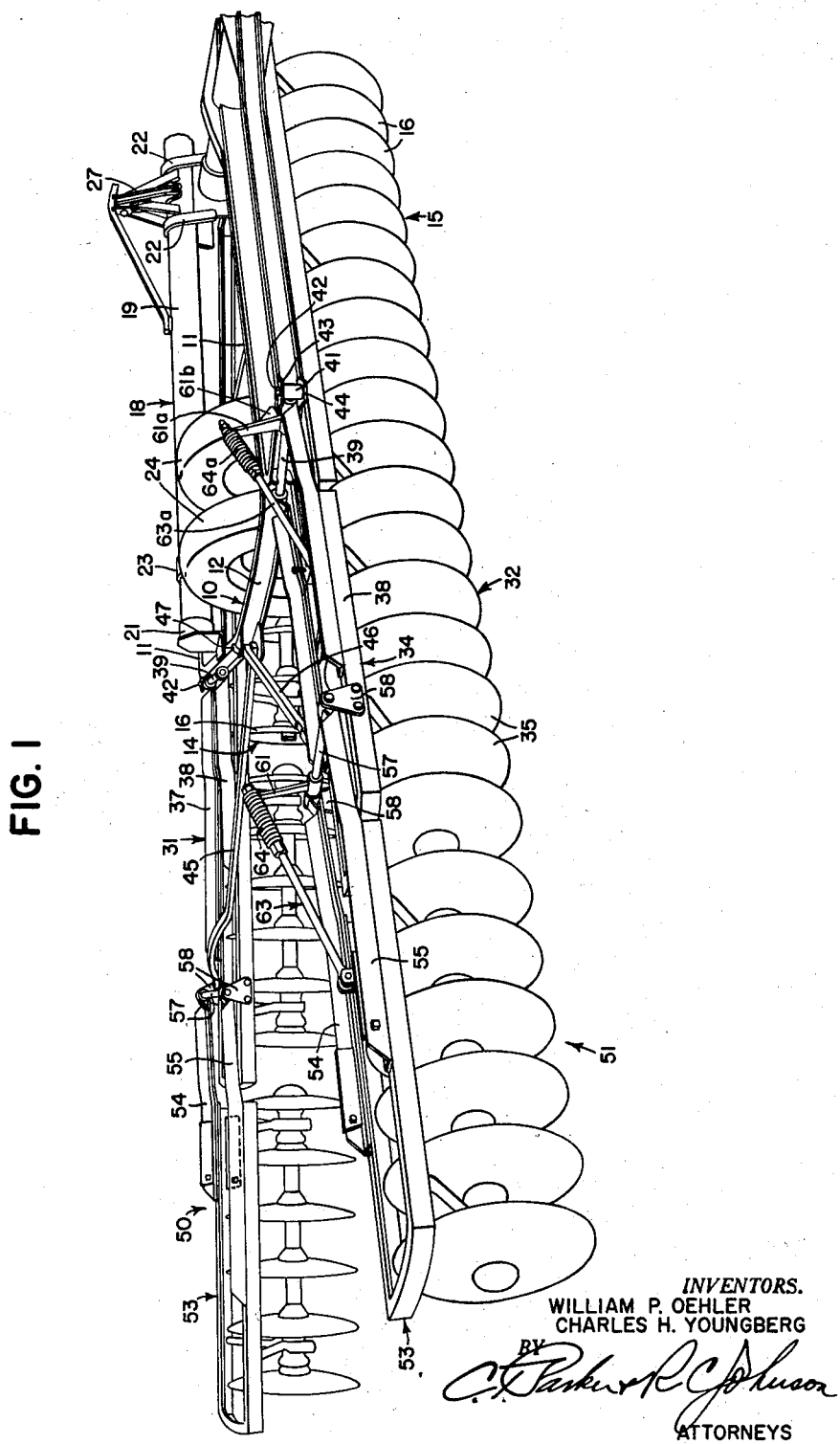

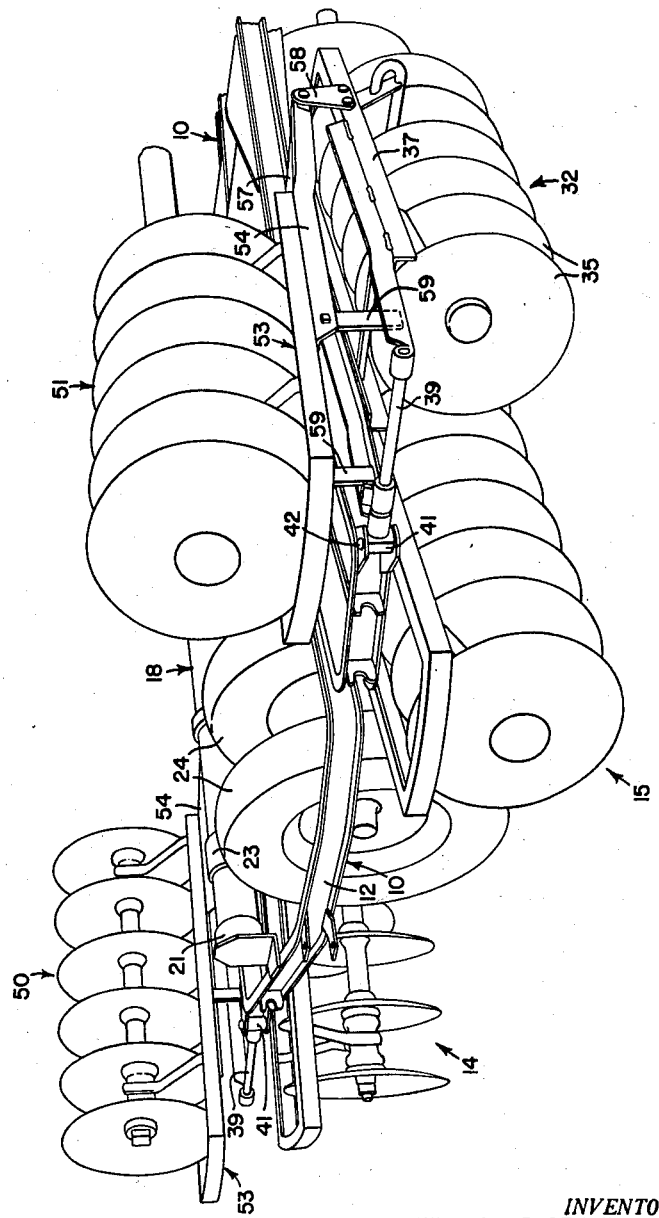

2,930,437

DISK HARROW WITH DOUBLE EXTENSIONS

William P. Oehler and Charles H. Youngberg, Moline, Ill., assignors, by mesne assignments, to Deere & Company, a corporation of Delaware Application December 28, 1956, Serial No. 631,141

2 Claims. (Cl. 172—568)

The present invention relates generally to agricultural implements and more particularly to disk harrows.

The object and general nature of the present invention is the provision of a disk harrow in which the disk gangs are so arranged as to be capable of working a relatively wide strip of ground and therefore capable of efficiently utilizing all of the available power of present day tractors. More specifically, it is a feature of this invention to provide a double extension type of disk harrow in which the main gang carries a first extension that can be swung inwardly from an outwardly extending working position to a position alongside the main gang, with the second extension pivotally connected with the normally outer portion of the first extension gang and shiftable into a folded position over and supported on the first extension gang, whereby both gangs may readily be shifted into a narrowed position, as for convenient transport along highways, lanes, through gates and the like.

It is the further and important feature of this invention to provide a disk harrow of the extension type, in which one extension gang is shiftably connected with the main gang so that it can be shifted or rolled along the ground from an extended operating position into a folded transport position, with a second extension gang that can be swung from an extended position over onto the first gang without requiring the exertion of excessive lifting effort, the second extension gang being supported on the first extension gang, but since the latter is of the type that can be rolled around into a folded position while supported on the ground, the presence of the second extension gang supported on the first extension gang does not materially interfere with the manual shifting of the first extension gang from extended to folded positions. Thus, the present invention makes it feasible to provide a disk harrow of exceptional width when in operating position but which can readily be folded into a narrowed position to facilitate transport without requiring the exertion of excessive effort to accomplish the reduction in width of the harrow.

These and other objects and advantages of the present invention will be apparent to those skilled in the art after a consideration of the following detailed description, taken in conjunction with the accompanying drawings, in which:

Fig. 1 is a persepective view, taken from the rear of the left hand portion of a disk harrow incorporating the principles of the present invention, the harrow being shown in its wide spread or operating position.

Fig. 2 is a view similar to Fig. 1, showing the harrow in a transport or folded position.

Referring first to Fig. 1, the main frame of the harrow is indicated in its entirety by the reference numeral 10 and comprises generally transverse structure that includes front and rear bars 11, preferably formed as channels, that are shaped to include end bars 12. Generally speaking, only the left-hand half of the frame and associated structure is shown in Fig. 1 but it is to be understood that the right half of the implement is substantially the same as the left half. The frame 10 carries front and rear gangs 14 and 15, each including a plurality of ground working disks 16. The main frame is raised and lowered relative to the ground by a wheel frame 18 that includes a generally transversely extending pipe member 19 rockable relative to the main frame 10 through bearing brackets 21 fixed to the end bars 12 and suitable intermediate bearing straps 22. The pipe member 19 has, fixed to the outer end thereof, wheel arms 23 to the rear and lower ends of which ground engaging wheels 24 are journalel. A pair of wheels 24 is disposed at each side of the disk harrow. Through suitable power means, such as a hydraulic cylinder, connected to an arm structure 27 that is fixed to the pipe member 19, the wheel 24 may be raised and lowered relative to the main frame so as to lower and raise, as required, the associated disk gangs. Normally, the harrow shown in Fig. 1 is connected with a tractor to be propelled thereby, the above mentioned hydraulic cylinder being interconnected with the tractor hydraulic power lift means so as to derive operating energy therefrom.

The front gangs 14, there being two of such gangs in the complete harrow, are rigidly connected with the forward portion of the main frame 10 while the two rear gangs, there being two rear gangs in the complete harrow, are rigidly connected with the frame 10. A first extension gang 31 is swingably connected with the outer portion of the associated front gang 14, and a similar first extension gang 32 is swingably connected with the outer portion of the rear gang 15. Since the front and rear first extension gangs 31 and 32 are of substantially the same construction, a detailed description of one will suffice. Each first extension gang includes a gang frame 34 to which a plurality of disks are connected in the usual way. Each gang frame 34 is preferably made up of front and rear angles 37 and 38, and the laterally inner ends of these angles are hingedly connected to a generally fore-and-aft extending pivot rod 39 one end of which carries a generally vertical sleeve 41 that is swingable about a vertical pin 42 carried by upper and lower brackets 43 and 44. The upper and lower brackets 43 and 44 are fixed to the adjacent portion of the main frame 10, and the pin 42 serves to define a vertical axis about which the associated first extension gang, 31 or 32, may swing relatively to the main gang in swinging from an outwardly extending working position to a transport position generally alongside the associated main gang. As shown in Fig. 1, the front extension gang 31 and the rear extension gang 32 are both shown in their working or extended position, and the extension gangs are held in this position by diagonal rods, indicated at 45 and 46, respectively, that are connected at their outer ends with a convenient point on the extension gang frames and at their inner ends are releasably connected to the main frame 10, as by a releasable pin 47 or other suitable means. When the first extension gangs 31 and 32 are to be swung around into their folded position alongside the associated main gangs, the pin 47 is taken out and the links 45 and 46 released, after which the extension gangs may be rolled around generally horizontally along the ground surface into their folded positions. Since the gangs are supported on the ground, no great amount of exertion is required to swing the first extension gangs 31 and 32 from their outwardly extending or operating position around into their folded position alongside the associated main gang.

It has been found that a disk harrow which comprises only the main gangs and the extension gangs just described does not efficiently make use of all of the power that is generally available in the farm tractors that are presently sold to farmers and operators, and in order to make use of this available power, the present invention contemplates the provision of a second extension gang swingably connected with the normally outer end of each of the first extension gangs. As shown in Fig. 1, the front second extension gang is indicated by the reference numeral 50 and the rear second extension gang is indicated by the reference numeral 51, and since these second extension gangs are substantially identical, a detailed description of only one of them will suffice. Each second extension gang includes a gang frame 53 of generally conventional construction and carrying at its inner end portion front and rear angle bars 54 and 55. Each of these bars is extended laterally inwardly and are pivotally connected with the fore-and-aft extending pivot member 57 that is carried by the outer end portion of the first extension gang, 31 or 32, by any suitable means, such as a pair of pivot-receiving brackets 58. It is to be noted that the pivot members 57 provide for swinging movement of the second extension gangs relative to the first extension gangs in a generally vertical plane, the second extension gangs moving about the generally fore-and-aft extending axes defined by the pivot members 57. The pivot members 57 are substantially like the pivot members 39 except that the vertical sleeve sections 41 are omitted.

Any suitable means may be provided for holding the second extension gangs 50 and 51 down in proper working position when the extension gangs are swung over and around into their aligned positions, as indicated in Fig. 1. For example, according to the principles of the present invention, there is provided an arm 61 on each of the pivot members 57, and the lower portion of this arm has a part (not shown) in Fig. 1 but similar to the part 61b described below that engages the conveniently adjacent portion of the frame of the first extension gangs so that when the extension gangs are in their aligned position, the arm 61 is held against inward movement. A strut member 63 is connected between the outer end of each arm 61 and an adjacent portion of the second extension gang frame, the strut including yieldable spring means 64. The front second extension gang 50 is provided with an arm 61 and strut 63 as just described, but for convenience of illustration these parts are omitted from the front second extension gang 50. Substantially identical means is provided for each of the first extension gangs, 31 and 32, and in Fig. 1 an arm 61a is shown as mounted on the associated pivot member 39, having a part or extension 61b that engages an adjacent part of the main frame 10. A spring cushioned strut 63a is connected between the outer end of the arm 61a and a convenient outwardly disposed point on the frame of the associated first extension gang. The associated springs 64 and 64a serve to maintain down pressure on the extension gangs so as to hold them to their work.

When it is desired to reduce the width of the implement, as for transport purposes, the laterally outer thrust exerting strut 63 and associated structure are detached so as to permit the second extension gangs to be folded upwardly and laterally inwardly over onto the associated first extension gangs. The second extension gangs are of fairly limited length, and their weight is such that they may with relative ease be lifted up and swung over onto the associated first extension gangs. Next the links 45 and 46 are disconnected, and then the first extension gangs, on which the second extension gangs are now supported, are rolled along the ground around the axes as defined by the pins 42 into folded positions alongside the associated main gangs. Although during this action the second extension gangs are supported by the first extension gangs, the latter may readily be manually manipulated since the combined gangs do not have to be lifted but can merely be rolled around on the ground until they are swung into their folded position, are shown in Fig. 2. As will be seen from this figure, the width of the harrow is now radically reduced, and movement of the harrow in a transport position, which is usually accomplished by raising the main frame and associated gang structure off the ground by swinging the wheel frame 18 downwardly so as to carry the weight of the entire harrow on the ground wheels 24, is thereby facilitated. In the folded positions of the gangs, the inner ends of the second extension gangs 50 and 51 are supported on the associated first extension gangs through the pivots 57 and associated brackets 58, and the other or outer ends of the extension gangs 50 and 51 are supported on the adjacent ends of the first extension gangs by any suitable means, such as a bracket or strut 59.

While there has been show and described the preferred structure in which the principles of the present invention have been incorporated, it is to be understood that the present invention is not to be limited to the particular details, shown and described above, but that, in fact, widely different means may be employed in the practice of the broader aspects of this invention.

What is claimed is:

1. A harrow comprising a main frame, a main disk gang, an elongated pivot member disposed generally horizontally and swingably connected at one end with the outer end of said main frame for movement relative thereto about a generally vertical axis, a first extension disk gang swingably connected at its inner end with said pivot member for generally upward swinging movement relative thereto about the longitudinal axis of said member, said extension gang being swingable with said pivot member through approximately 180° about said generally vertical axis between a position in which the extension gang is aligned in outwardly extending relation and a position generally adjacent one side of the main gang, a second extension gang pivotally connected with the other end of said first extension gang for movement over onto said first extension gang about an axis generally parallel to the longitudinal axis of said elongated pivot member whereby when operating in axially extending position both of said extensions may swing upwardly so as to accommodate operation over uneven terrain, spring means carried by said extension gangs to yieldably resist upward movement about said parallel axes, and means on said first extension gang adjacent said pivot member for supporting the associated end of said second extension gang on said first extension gang.

2. A wheel harrow of the double extension type, comprising a main frame, a main disk gang connected therewith, wheel means movably connected with said main frame and movable relative thereto to raise said frame and said gang, a first extension gang swingable generally horizontally relative to the main gang between an outwardly extended working position and an inwardly disposed transport position alongside said main gang, a second extension gang pivotally connected with said first extension gang and movable relative to the latter between an extended working position and a folded transport position, means supporting the second extension gang on said first extension gang when the first and second extension gangs are in folded relation, and means supporting both extension gangs on said main gang in the transport position, whereby operation of the wheel means to raise the main gang also raises both extension gangs.

References Cited in the file of this patent
UNITED STATES PATENTS

| | | |
|---|---|---|
| 1,846,005 | Hoffman | Feb. 16, 1932 |
| 2,345,803 | Gemberling | Apr. 4, 1944 |
| 2,621,459 | Scott | Dec. 16, 1952 |
| 2,641,886 | Graham | June 16, 1953 |
| 2,706,880 | Steuerwald | Apr. 26, 1955 |
| 2,754,647 | Bennett et al. | July 17, 1956 |